(12) United States Patent
Hanrahan

(10) Patent No.: US 11,952,949 B2
(45) Date of Patent: Apr. 9, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/903,699

(22) Filed: Sep. 6, 2022

(65) Prior Publication Data

US 2024/0077034 A1 Mar. 7, 2024

(51) Int. Cl.

| | | |
|---|---|---|
| *F16H 37/06* | (2006.01) | |
| *B64D 27/10* | (2006.01) | |
| *F02C 7/36* | (2006.01) | |
| *F16H 57/10* | (2006.01) | |

(52) U.S. Cl.
CPC ............... *F02C 7/36* (2013.01); *B64D 27/10* (2013.01); *F16H 37/065* (2013.01); *F16H 57/10* (2013.01)

(58) Field of Classification Search
CPC .......... F02C 7/36; F16H 37/065; F16H 57/10; F16H 2200/2038
See application file for complete search history.

(56) References Cited

U.S. PATENT DOCUMENTS

| | | | |
|---|---|---|---|
| 4,651,521 A | 3/1987 | Ossi | |
| 4,791,783 A | 12/1988 | Neitzel | |
| 5,209,428 A | 5/1993 | Bevilaqua | |
| 6,269,627 B1 | 8/2001 | Freese | |
| 6,270,037 B1 | 8/2001 | Freese | |
| 10,759,413 B2* | 9/2020 | Hata | B60W 10/06 |
| 10,954,813 B2 | 3/2021 | Wuestenberg | |
| 2014/0010652 A1 | 1/2014 | Suntharalingam | |
| 2018/0208177 A1 | 7/2018 | Hata | |
| 2020/0017229 A1 | 1/2020 | Steinert | |
| 2023/0382549 A1 | 11/2023 | Hanrahan | |

OTHER PUBLICATIONS

EP search report for EP23195512.1 dated Feb. 26, 2024.

* cited by examiner

*Primary Examiner* — Derek D Knight
(74) *Attorney, Agent, or Firm* — Getz Balich LLC

(57) ABSTRACT

An assembly is provided for an aircraft propulsion system. This assembly includes a carrier, a first gear system, a second gear system and a lock device. The first gear system includes a sun gear, a first ring gear and a plurality of first intermediate gears between and meshed with the sun gear and the first ring gear. Each of the first intermediate gears is rotatably mounted to the carrier. The second gear system includes a second ring gear and a plurality of second intermediate gears meshed with the second ring gear. Each of the second intermediate gears is rotatably mounted to the carrier. The lock device is configured to lock rotation of the carrier about an axis during a first mode. The lock device is configured to unlock rotation of the carrier about the axis during a second mode.

18 Claims, 11 Drawing Sheets

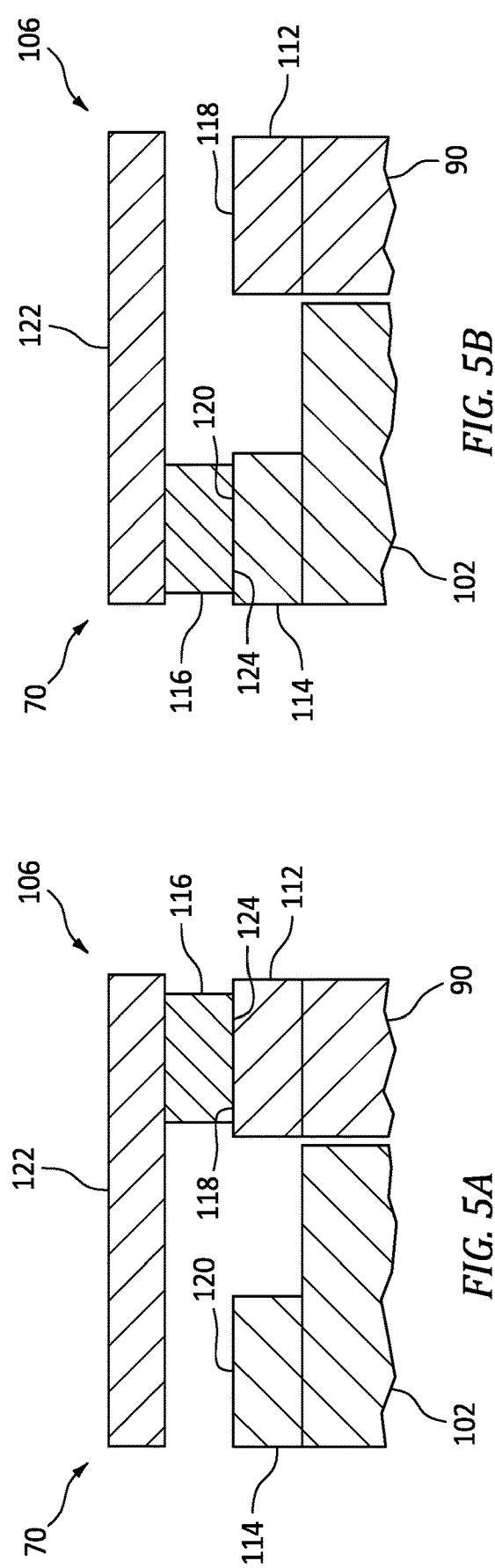
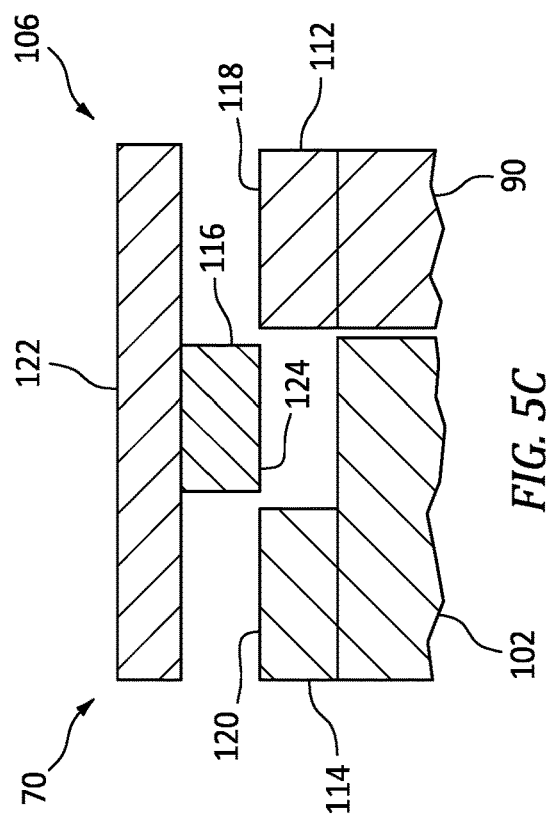

SELECTIVE POWER DISTRIBUTION FOR AN AIRCRAFT PROPULSION SYSTEM

BACKGROUND OF THE DISCLOSURE

1. Technical Field

This disclosure relates generally to an aircraft propulsion system and, more particularly, to power distribution between different rotors of the aircraft propulsion system.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes a carrier, a first gear system, a second gear system and a lock device. The first gear system includes a sun gear, a first ring gear and a plurality of first intermediate gears between and meshed with the sun gear and the first ring gear. Each of the first intermediate gears is rotatably mounted to the carrier. The second gear system includes a second ring gear and a plurality of second intermediate gears meshed with the second ring gear. Each of the second intermediate gears is rotatably mounted to the carrier. The lock device is configured to lock rotation of the carrier about an axis during a first mode. The lock device is configured to unlock rotation of the carrier about the axis during a second mode.

According to another aspect of the present disclosure, another assembly is provided for an aircraft propulsion system. This assembly includes a carrier, a first gear system, a second gear system and a lock device. The first gear system includes a sun gear, a first ring gear and a plurality of first intermediate gears between and meshed with the sun gear and the first ring gear. Each of the first intermediate gears is rotatably mounted to the carrier. The second gear system includes a second ring gear and a plurality of second intermediate gears meshed with the second ring gear. Each of the second intermediate gears is rotatably mounted to the carrier. The lock device is configured to unlock rotation of the second ring gear about an axis during a first mode. The lock device is configured to lock rotation of the second ring gear about the axis during a second mode.

According to still another aspect of the present disclosure, another assembly is provided for an aircraft propulsion system. This assembly includes a carrier and a geartrain including a first gear system and a second gear system. The first gear system includes a sun gear, a first ring gear and a plurality of first intermediate gears between and meshed with the sun gear and the first ring gear. Each of the first intermediate gears is rotatably mounted to the carrier. The second gear system includes a second ring gear and a plurality of second intermediate gears meshed with the second ring gear. Each of the second intermediate gears is rotatably mounted to the carrier. Each of the second intermediate gears may be configured to turn in unison with a respective one of the first intermediate gears. The sun gear is configured to drive rotation of the first ring gear about an axis at: a first number times a rotational input speed of the sun gear about the axis during a first mode; and a second number times the rotational input speed of the sun gear about the axis during a second mode. The first number is greater than the second number.

Each of the second intermediate gears may be rotationally fixed to a respective one of the first intermediate gears.

The sun gear may be configured to drive rotation of the first ring gear about the axis during the first mode and the second mode.

The lock device may be configured to: lock rotation of the carrier about the axis during the first mode; unlock rotation of the carrier about the axis during the second mode; and unlock rotation of the carrier about the axis and unlock rotation of the second ring gear when transitioning between the first mode and the second mode.

The assembly may also include a brake configured to brake rotation of the second ring gear about the axis. The brake may be located remote from the first gear system.

Each of the second intermediate gears may be rotatable with a respective one of the first intermediate gears.

The lock device may be configured to: unlock rotation of the second ring gear about the axis during the first mode; and lock rotation of the second ring gear about the axis during the second mode.

The lock device may be configured to unlock rotation of the carrier about the axis and unlock rotation of the second ring gear during a third mode.

The lock device may include a first splined inner element, a second splined inner element and a splined outer element. The first splined inner element may be configured with the carrier. The second splined inner element may be configured with the second ring gear. The splined outer element may be configured to translate along the axis. The splined outer element may be meshed with the first splined inner element during the first mode. The splined outer element may be meshed with the second splined inner element during the second mode. The splined outer element may be disengaged from the first splined inner element and the second splined inner element during the third mode.

The splined outer element may be in a first mode position during the first mode. The splined outer element may be in a second mode position during the second mode. The splined outer element may be in a third mode position during the third mode. The third mode position may be axially between the first mode position and the second mode position along the axis.

The assembly may also include a brake configured to brake rotation of the carrier about the axis.

The brake may be configured to brake rotation of the carrier about the axis to a zero rotational speed about the axis. The lock device may be configured to lock rotation of the carrier about the axis when the carrier is at the zero rotational speed.

The assembly may also include a brake configured to brake rotation of the second ring gear about the axis.

The brake may be configured to brake rotation of the second ring gear about the axis to a zero rotational speed about the axis. The lock device may be configured to lock rotation of the second ring gear about the axis when the second ring gear is at the zero rotational speed.

The brake may be configured as or otherwise include a disk brake.

The assembly may also include a gas turbine engine core including a compressor section, a combustor section, a turbine section and a rotating structure. The rotating structure may include a turbine rotor within the turbine section. The rotating structure may be coupled to and configured to drive rotation of the sun gear.

The assembly may also include a first propulsor rotor and/or a second propulsor rotor. The first propulsor rotor may be coupled to and configured to be rotatably driven by the first ring gear. The second propulsor rotor may be coupled to and configured to be rotatably driven by the carrier.

The first propulsor rotor may be rotatable about the axis. The second propulsor rotor may be rotatable about a second axis that is angularly offset from the axis.

The first propulsor rotor may be configured to generate propulsive force in a first direction. The second propulsor rotor may be configured to generate propulsive force in a second direction that is different than the first direction.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A-C are schematic illustrations of the lock device of FIG. 2 during various modes of operation.

DETAILED DESCRIPTION

Figure 1:
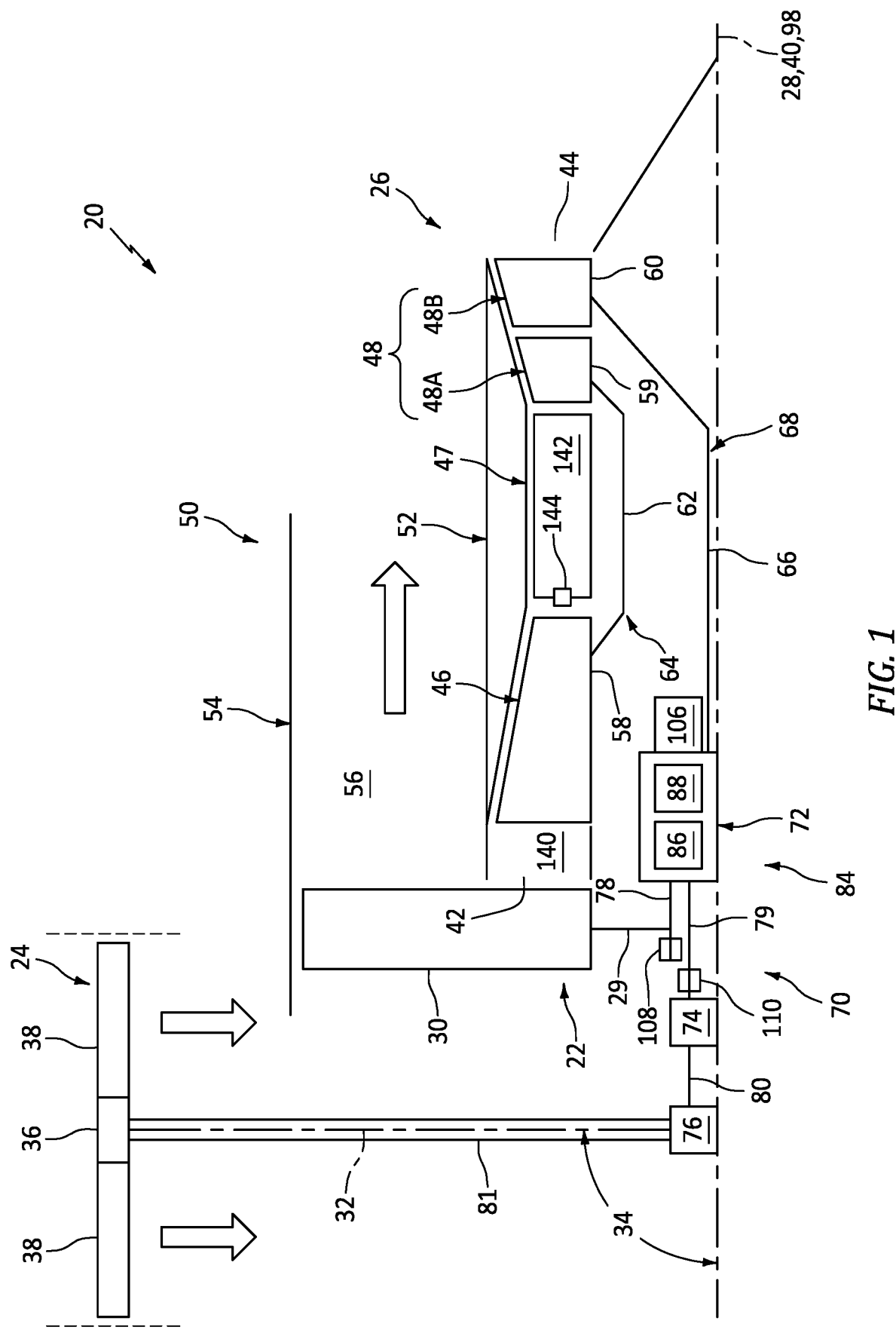
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

Figure 2:
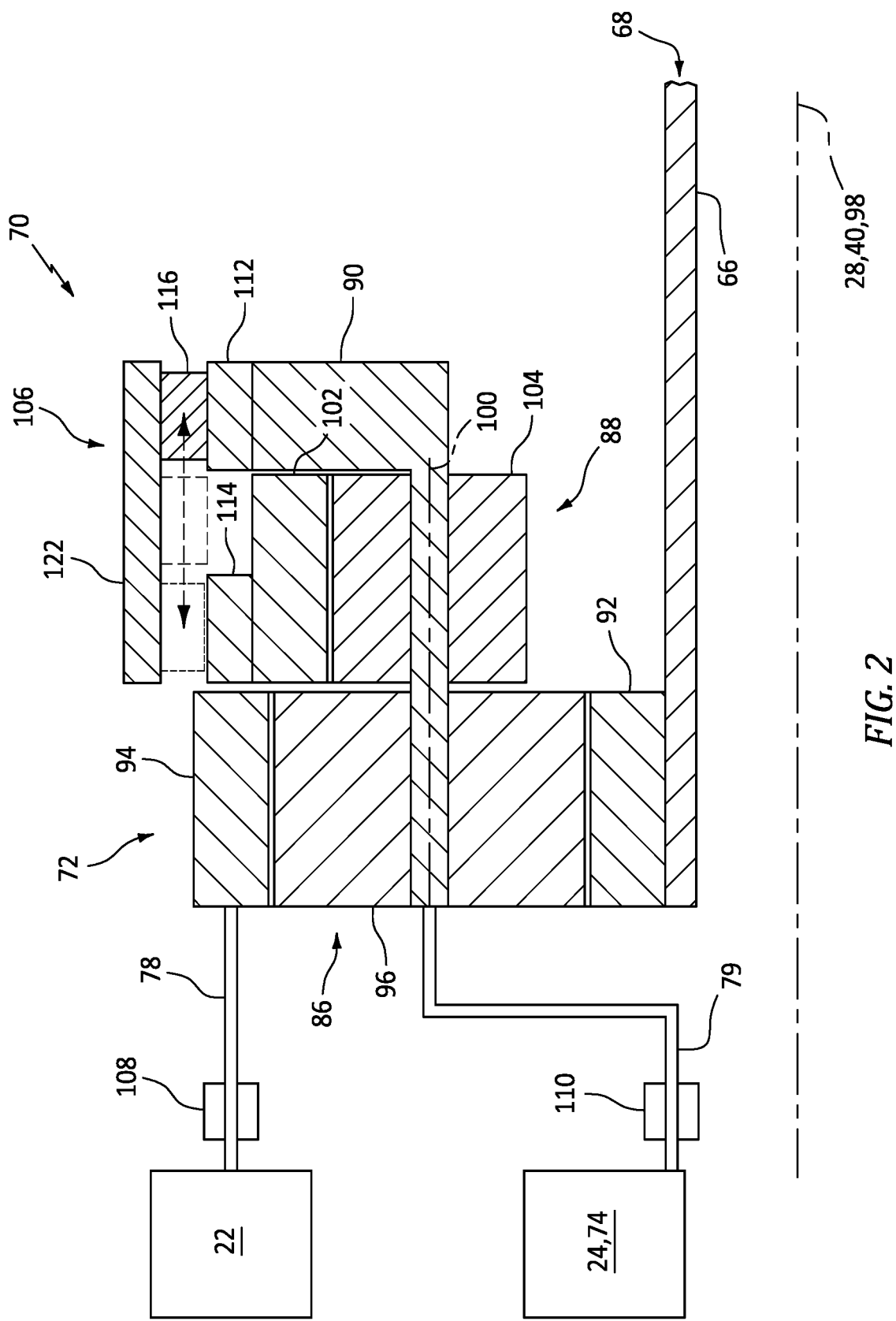
FIG. 2 is a partial, schematic illustration of a portion of the aircraft propulsion system of FIG. 1 about a geartrain arranged with a lock device.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 74, a gearing 76 (e.g., bevel gearing) and one or more shafts 78-81 and/or other torque transmission devices for coupling the geartrain 72 to the first propulsor rotor 22 and the second propulsor rotor 24. The powertrain 70 of FIG. 1 also includes a propulsion control system 84. Referring to FIG. 2, the geartrain 72 includes a first gear system 86, a second gear system 88 and a gear carrier 90.

Figure 3A:
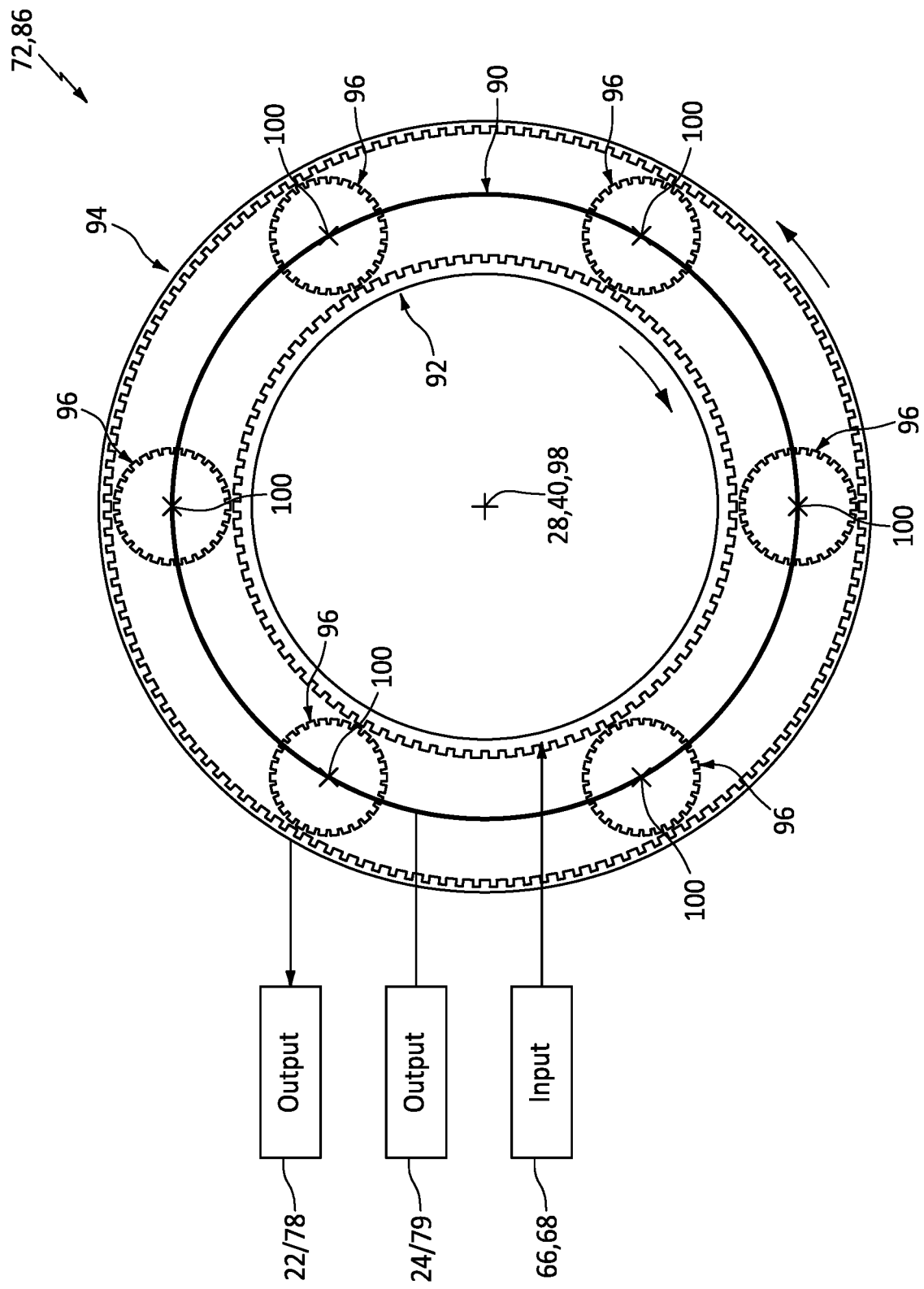
FIGS. 3A and 3B are schematic illustrations of a first gear system coupled between an input and multiple outputs during various modes of operation.
Figure 3B:
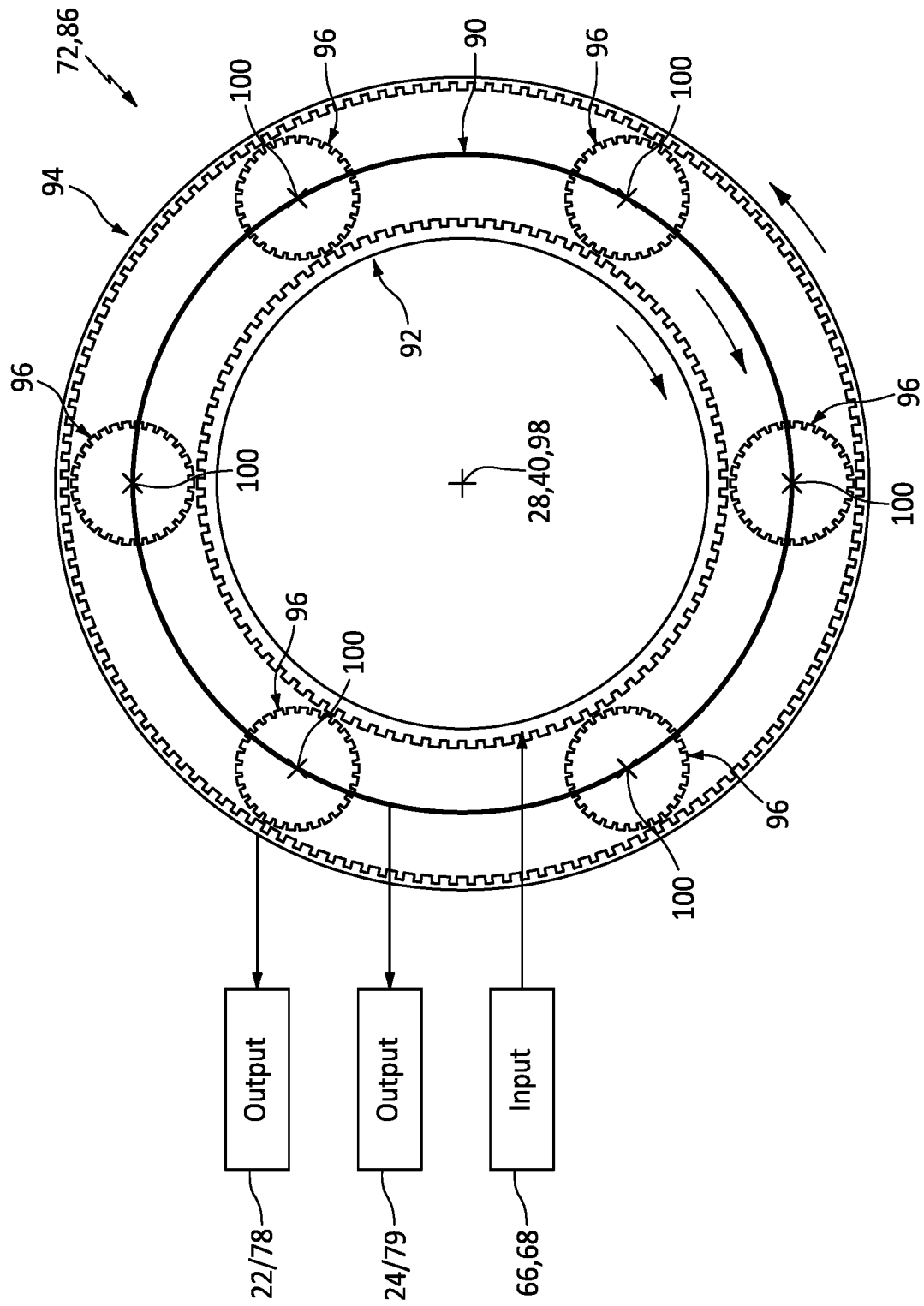

Referring to FIGS. 3A and 3B, the first gear system 86 may be configured as an epicyclic gear system. The first gear system 86 may be operable as a star gear system during a star system mode of operation; e.g., see FIG. 3A. The first gear system 86 may be operable as an open gear system during an open mode of operation; e.g., see FIG. 3B.

The first gear system 86 of FIGS. 3A and 3B includes a sun gear 92 (e.g., an inner gear), a first ring gear 94 (e.g., an outer gear) and one or more first intermediate gears 96 (e.g., planet or star gears). The sun gear 92 is rotatable about a centerline axis 98 of the geartrain 72, which centerline axis 98 may be parallel (e.g., coaxial) with the axis 28, 40. The first ring gear 94 is rotatable about the centerline axis 28, 40, 98 during the star system mode of operation (see FIG. 3A) and the open mode of operation (see FIG. 3B). This first ring gear 94 extends circumferentially around (e.g., circumscribes) the sun gear 92 and an annular array of the first intermediate gears 96. The first intermediate gears 96 are arranged circumferentially about the centerline axis 28, 40, 98 in the annular array. Each of the first intermediate gears 96 is radially between and meshed with the sun gear 92 and the first ring gear 94. Each of the first intermediate gears 96 is rotatable about a respective intermediate gear axis 100, and is rotatably mounted to and supported by the carrier 90. The carrier 90 is rotatable about the centerline axis 28, 40, 98 during at least (or only) the open system mode of operation (see FIG. 3B).

Figure 4A:
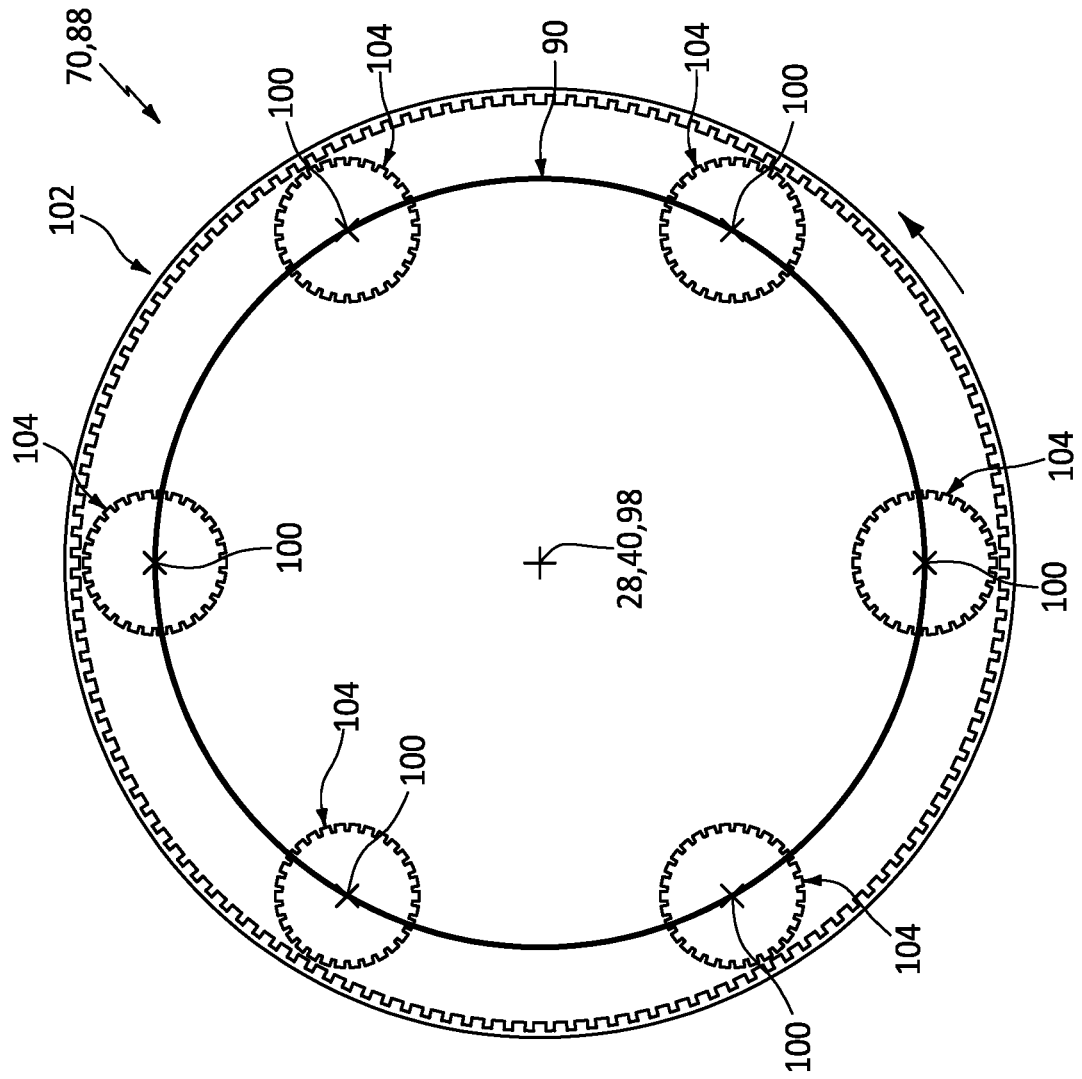
FIGS. 4A and 4B are schematic illustrations of a second gear system during various modes of operation.
Figure 4B:
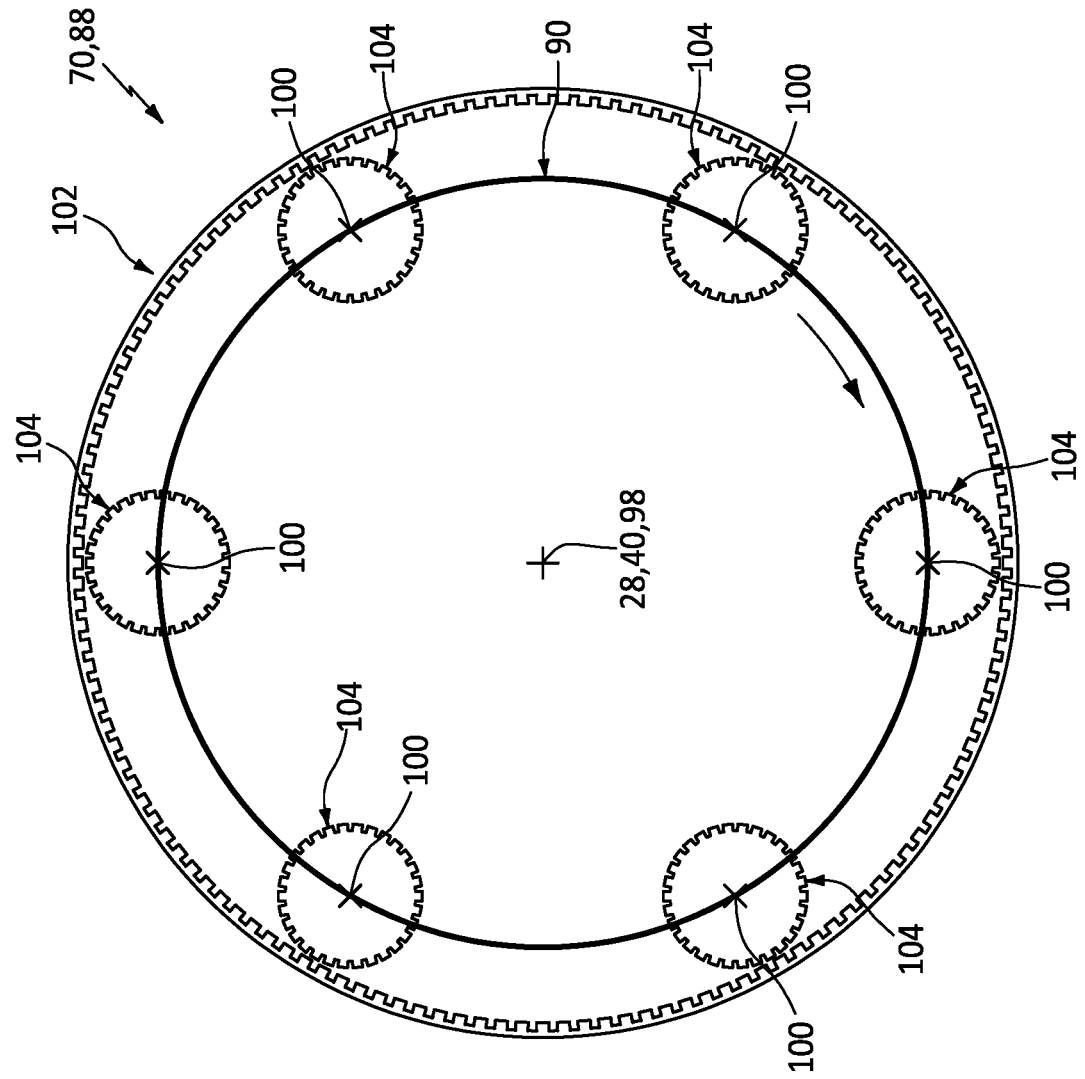

Referring to FIGS. 4A and 4B, the second gear system 88 includes a second ring gear 102 (e.g., an outer gear) and one or more second intermediate gears 104. The second ring gear 102 is rotatable about the centerline axis 28, 40, 98. This second ring gear 102 extends circumferentially around (e.g., circumscribes) an annular array of the second intermediate gears 104. The second intermediate gears 104 are arranged circumferentially about the centerline axis 28, 40, 98 in the annular array. Each of the second intermediate gears 104 is radially within and meshed with the second ring gear 102. Each of the second intermediate gears 104 is rotatable about a respective intermediate gear axis 100, and is rotatably mounted to and supported by the carrier 90. Each of the second intermediate gears 104 may be rotatable with a respective one of the first intermediate gears 96. Each of the second intermediate gears 104, for example, may be formed as an integral part of or otherwise fixedly attached (e.g., directly or indirectly) to the respective first intermediate gear 96 such that those respective gears 96 and 104 turn together (e.g., in unison, in a common direction and/or at a common speed) about the intermediate gear axis 100.

Referring to FIG. 2, the sun gear 92 is coupled to the low speed rotating structure 68 and its low speed shaft 66, where the low speed shaft 66 provides a power input for the geartrain 72. The first ring gear 94 is coupled to the first propulsor rotor 22 through the first propulsor shaft 78, where the first propulsor shaft 78 provides a first power output from the geartrain 72. The carrier 90 and, thus, the first intermediate gears 96 (and the second intermediate gears 104) are coupled to the second propulsor rotor 24 through the system elements 74, 76 and 79-81 (see also FIG. 1), where the geartrain output shaft 79 provides a second power output from the geartrain 72. More particularly, the carrier 90 is coupled to the transmission 74 through the geartrain output shaft 79; although, the carrier 90 is stationary during the first mode as described below in further detail.

Referring to FIG. 1, an output of the transmission 74 is connected to the gearing 76 through the transmission output shaft 80. This transmission 74 may be configured to selectively couple (e.g., transfer mechanical power between) the geartrain output shaft 79 and the transmission output shaft 80. During the first mode of operation, for example, the transmission 74 may be configured to decouple the geartrain output shaft 79 from the transmission output shaft 80, thereby decoupling the low speed rotating structure from the second propulsor rotor 24. During the second mode of operation (and the third mode of operation), the transmission 74 may be configured to couple the geartrain output shaft 79 with the transmission output shaft 80, thereby coupling the low speed rotating structure 68 with the second propulsor rotor 24. The transmission 74 may be configured as a clutched or clutchless transmission.

An output of the gearing 76 is connected to the second propulsor rotor 24 through the second propulsor shaft 81. This gearing 76 provides a coupling between the transmission output shaft 80 rotating about the axis 28, 40, 98 and the second propulsor shaft 81 rotating about the second rotor axis 32. The gearing 76 may also provide a speed change mechanism between the transmission output shaft 80 and the second propulsor shaft 81. The gearing 76, however, may alternatively provide a 1:1 rotational coupling between the transmission output shaft 80 and the second propulsor shaft 81 such that the transmission output shaft 80 and the second propulsor shaft 81 rotate at a common (e.g., the same) rotational speed. Furthermore, in some embodiments, the gearing 76 and the transmission output shaft 80 may be omitted where the functionality of the gearing 76 is integrated into the transmission 74. In still other embodiments, the transmission 74 may be omitted where decoupling of the second propulsor rotor 24 is not required and/or where an optional additional speed change between the carrier 90 and the second propulsor rotor 24 is not required.

The propulsion control system 84 is configured to (A) slow and/or stop rotation of the second propulsor rotor 24 during the first and/or the third modes of operation, and (B) slow rotation of the first propulsor rotor 22 during the second and/or the third modes of operation. The propulsion control system 84 includes a lock device 106 and one or more brakes 108 and 110.

Referring to FIG. 5A, the lock device 106 is configured to selectively lock (e.g., stop, prevent) rotation of the carrier 90 about the axis 28, 40, 98 (see FIG. 2) and/or rotation of any one or more other system elements 24, 79-81 coupled to the carrier 90 during, for example, the first mode of operation. Referring to FIGS. 5B and 5C, the device is configured to selectively unlock (e.g., permit, facilitate) rotation of the carrier 90 about the axis 28, 40, 98 and/or rotation of any one or more other system elements 24, 79-81 coupled to the carrier 90 during, for example, the second or the third modes of operation. On the other hand, referring to FIGS. 5A and 5C, the lock device 106 of FIGS. 5A and 5C is configured to selectively unlock (e.g., permit, facilitate) rotation of the second ring gear 102 about the axis 28, 40, 98 (see FIG. 2) during, for example, the first or the third modes of operation. Referring to FIG. 5B, the lock device 106 is configured to selectively lock (e.g., stop, prevent) rotation of the second ring gear 102 about the axis 28, 40, 98 during, for example, the second mode of operation. The lock device 106 of FIGS. 5A-C includes one or more splined inner elements 112 and 114 and a splined outer element 116.

Figure 6:
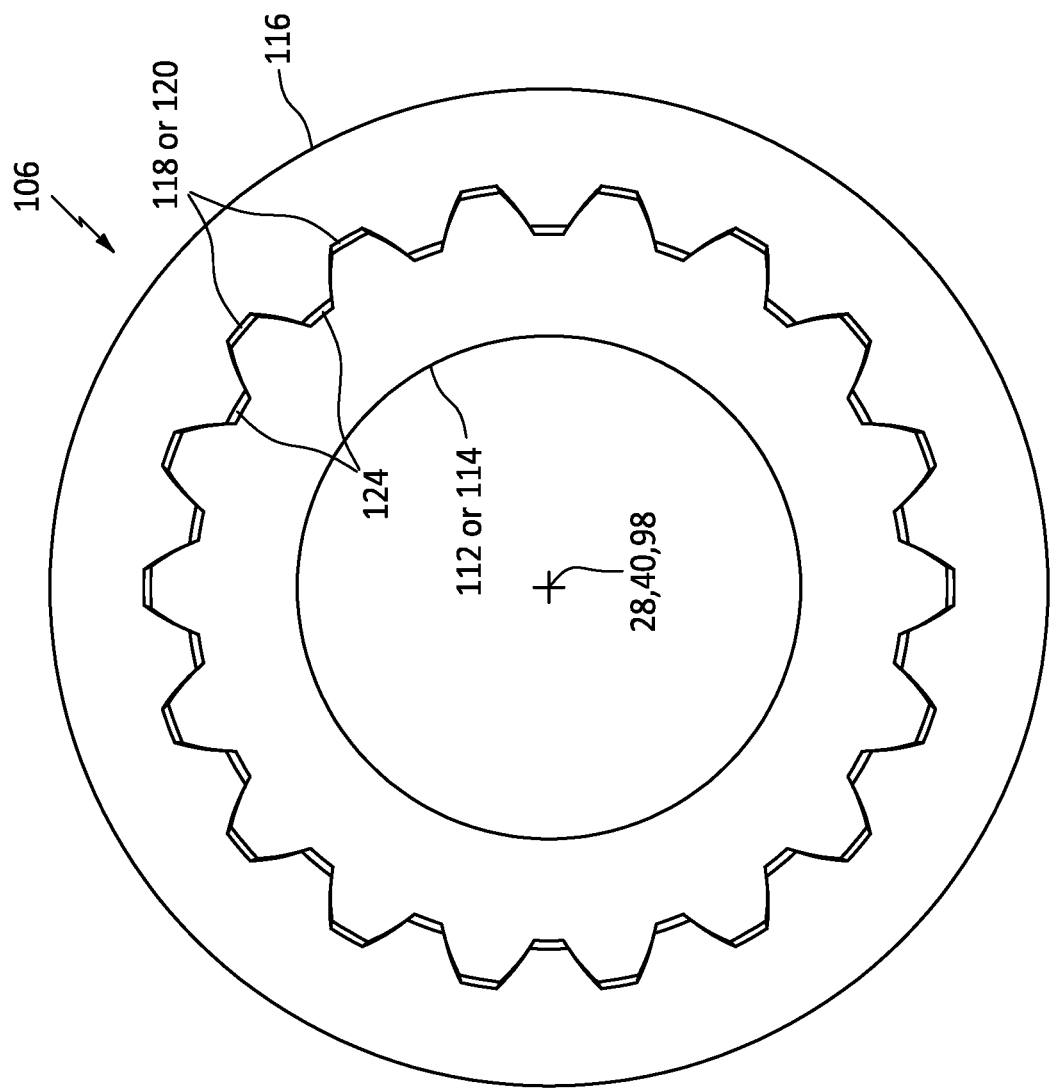
FIG. 6 is a simplified cross-sectional illustration of the lock device of FIG. 2.

The first splined inner element 112 is configured with the carrier 90. The first splined inner element 112, for example, may be formed as an integral part of or may be fixedly attached (e.g., directly or indirectly) to the carrier 90. The first splined inner element 112 includes a plurality of first outer splines 118 (schematically shown in FIGS. 5A-C) arranged in an array about the axis 28, 40, 98; see also FIG. 6.

The second splined inner element 114 is configured with the second ring gear 102. The second splined inner element 114, for example, may be formed as an integral part of or may be fixedly attached (e.g., directly or indirectly) to the second ring gear 102. The second splined inner element 114 includes a plurality of second outer splines 120 arranged in an array about the axis 28, 40, 98; see also FIG. 6.

The splined outer element 116 may be configured as a translatable sleeve. The splined outer element 116, for example, is rotationally fixed to a stationary structure 122 (e.g., a part of or connected to the engine housing 50), but is axially translatable along the axis 28, 40, 98 between/to a first mode position (see FIG. 5A), a second mode position (see FIG. 5B) and a third mode position (see FIG. 5C). The third mode position may be axially between the first mode position and the second mode position along the axis 28, 40, 98 of FIG. 2. The splined outer element 116 of FIGS. 5A-C includes a plurality of inner splines 124 arranged in an array about the axis 28, 40, 98; see also FIG. 6.

When in the first mode position of FIG. 5A, the splined outer element 116 axially overlaps and circumscribes the first splined inner element 112. The inner splines 124 engage (e.g., mesh with) the first outer splines 118. The inner splines 124, however, are disengaged with (e.g., spaced from) the second outer splines 120. With this arrangement, the lock device 106 is operable to fix rotation of the carrier 90 while permitting rotation of the second ring gear 102.

When in the second mode position of FIG. 5B, the splined outer element 116 axially overlaps and circumscribes the second splined inner element 114. The inner splines 124 engage (e.g., mesh with) the second outer splines 120. The inner splines 124, however, are disengaged with (e.g., spaced from) first outer splines 118. With this arrangement, the lock device 106 is operable to fix rotation of the second ring gear 102 while permitting rotation of the carrier 90.

When in the third mode position of FIG. 5C, the splined outer element 116 is axially between and misaligned (e.g., axially offset) from the first splined inner element 112 and the second splined inner element 114. The inner splines 124 are disengaged with (e.g., spaced from) the first outer splines 118 and the second outer splines 120. With this arrangement, the lock device 106 is operable to permit rotation of the carrier 90 and the second ring gear 102.

Referring to FIG. 2, the ring gear brake 108 is configured to brake (e.g., slow and/or stop) rotation of the second ring gear 102 and/or any one or more components rotatable with the second ring gear 102; see also FIG. 1. The ring gear brake 108 of FIG. 2, for example, is arranged with the first propulsor shaft 78. The carrier brake 110, on the other hand, is configured to brake (e.g., slow and/or stop) rotation of the carrier 90 and/or any one or more components rotatable with the carrier 90; see also FIG. 1. The carrier brake 110 of FIG. 2, for example, is arranged with the geartrain output shaft 79.

Figure 7:
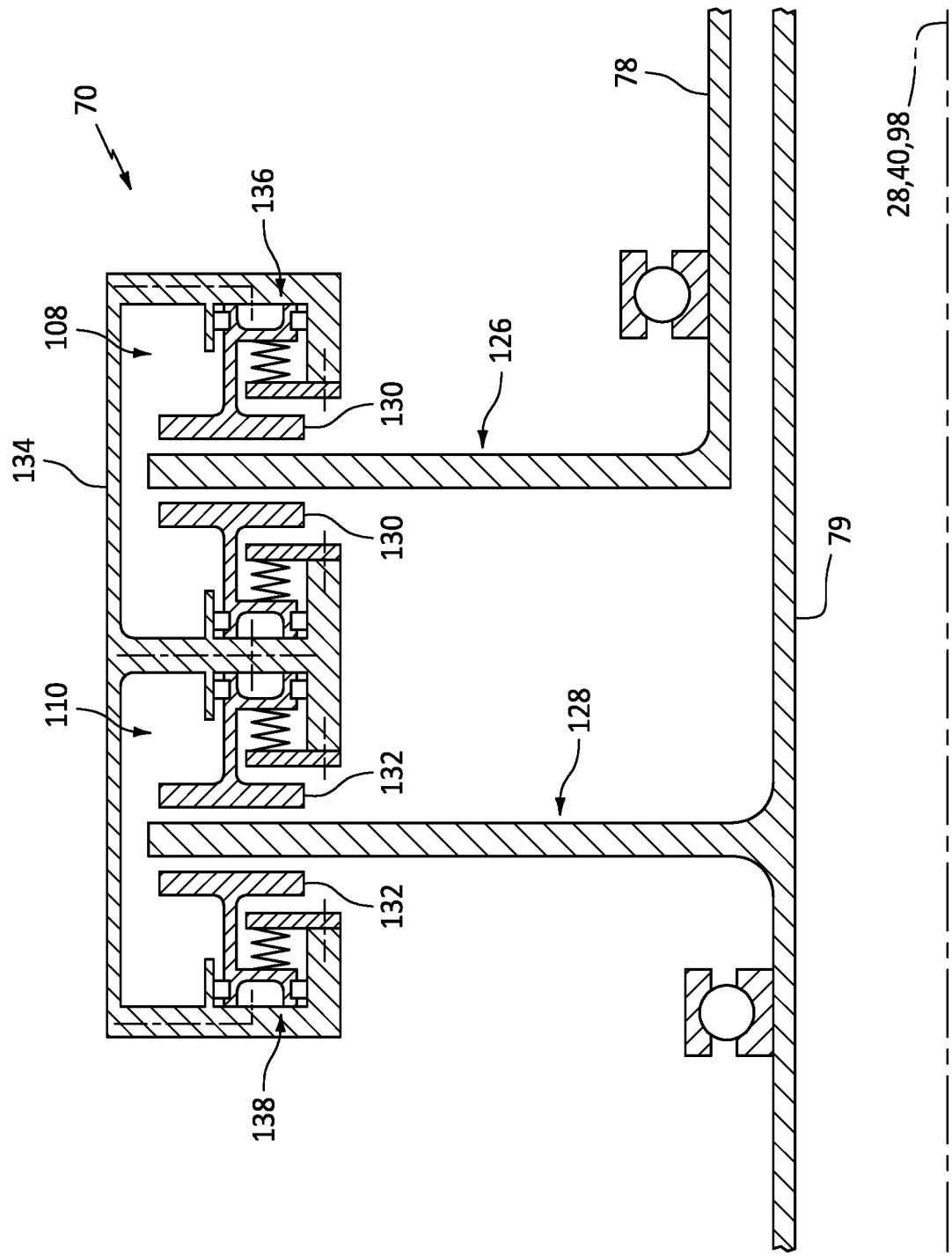
FIG. 7 is a partial side sectional illustration of a brake system arranged with multiple rotatable shafts.

Referring to FIG. 7, each of the brakes 108, 110 may be configured as or otherwise include a respective disk brake. The each of the brakes 108, 110, for example, includes a respective brake rotor 126, 128 and one or more respective brake pads 130, 132. The brake rotor 126, 128 is connected to and rotatable with the respective shaft 78, 79 of FIG. 7; or another rotating element (directly or indirectly) rotatable with the second ring gear 102, the carrier 90. The brake pads 130, 132 are anchored to a stationary structure 134. The brake pads 130, 132 may be actuated by a respective actuator 136, 138 (e.g., a hydraulic brake actuator) to move from an open position to a closed position where the brake pads 130, 132 clamp onto the brake rotor 126, 128. Frictional rubbing between the brake pads 130, 132 and the brake rotor 126, 128 brake rotation of the brake rotor 126, 128 and, thus, the shaft 78, 79 (or the other rotating element) connected thereto.

Referring to FIG. 1, during operation of the aircraft propulsion system 20, air enters the engine core 26 through the airflow inlet 42. This air is directed into a core flowpath 140 which extends sequentially through the compressor section 46, the combustor section 47, the HPT section 48A and the LPT section 48B to the exhaust 44. The air within this core flowpath 140 may be referred to as core air.

The core air is compressed by the compressor rotor 58 and directed into a (e.g., annular) combustion chamber 142 of a (e.g., annular) combustor in the combustor section 47. Fuel is injected into the combustion chamber 142 through one or more fuel injectors 144 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 may drive rotation of the first propulsor rotor 22 through the geartrain 72 during, for example, the first, the second and the third modes of operation. The rotation of the low speed rotating structure 68 may also drive rotation of the second propulsor rotor 24 through the geartrain 72 during, for example, the second and the third modes of operation. The second propulsor rotor 24, however, may be stationary during the first mode of operation.

During the first mode of operation, the splined outer element 116 of FIG. 5A engages the first splined inner element 112 and is disengaged from the second splined inner element 114. The lock device 106 may thereby rotationally fix (e.g., prevent rotation of) the carrier 90 and any one or more elements 24, 79-81 (see FIG. 1) rotationally coupled to the carrier 90.

During the first mode of operation, the geartrain 72 of FIG. 2 provides a first mode speed change ratio between the low speed rotating structure 68 and the first propulsor rotor 22. More particularly, the sun gear 92 of FIG. 2 is configured to drive rotation of the first ring gear 94 about the axis 28, 40, 98 by a first number (X) times the rotational input speed of the sun gear 92 about the axis 28, 40, 98.

To enter this first mode of operation while the carrier 90 is rotating about the axis 28, 40, 98, the carrier brake 110 may be engaged to brake rotation of the carrier 90. Once the carrier 90 is braked to a zero rotational velocity about the axis 28, 40, 98, the lock device 106 may be engaged as described above to fix rotation of the carrier 90. The carrier brake 110 may subsequently be released. By contrast, to leave the first mode of operation to permit rotation of the carrier 90 about the axis 28, 40, 98, the lock device 106 may be disengaged and the splined outer element 116 may be moved to the third mode position of FIG. 5C.

During the second mode of operation, the splined outer element 116 of FIG. 5B engages the second splined inner element 114 and is disengaged from the first splined inner element 112. The lock device 106 may thereby rotationally fix (e.g., prevent rotation of) the second ring gear 102.

During the second mode of operation, the geartrain 72 of FIG. 2 provides a second mode speed change ratio between the low speed rotating structure 68 and the first propulsor rotor 22 that is different than the first mode speed change ratio. More particularly, the sun gear 92 of FIG. 2 is configured to drive rotation of the first ring gear 94 about the axis 28, 40, 98 by a second number (Y) times the rotational input speed of the sun gear 92 about the axis 28, 40, 98. This second number (Y) is less than the first number (X) such that the first ring gear 94 and, thus, the first propulsor rotor 22 rotates slower during the second mode of operation than during the first mode of operation. The first number (X), for example, may be two times (2×), five times (5×), ten times (10×) or more the second number (Y). The present disclosure, however, is not limited to such an exemplary speed change ratio.

Reducing the rotational speed of the first propulsor rotor 22 during the second mode of operation reduces or substantially eliminates (e.g., de minimis) the first direction propulsive thrust generated by the first propulsor rotor 22. Reducing first propulsor rotor thrust may, in turn, increase power available for driving rotation of the second propulsor rotor 24 and/or facilitate substantial second direction aircraft movement; e.g., without first direction aircraft movement. However, maintaining some rotation of the first propulsor rotor 22 may maintain lubrication of one or more bearings supporting the various rotating elements such as the first propulsor shaft 78 of FIG. 1 and/or prevent bearing related damage. For example, when a component support by a bearing is not rotating, horizontal shock loads may damage one of more internal components of the bearing. Examples of such bearing damage may include, but are not limited to, brinelling and false brinelling. Maintaining some rotation of the first propulsor rotor 22 may also or alternatively prevent an exhaust backflow through the bypass flowpath 56 into the inlet 42. Maintaining some rotation of the first propulsor rotor 22 may still also or alternatively prevent debris (e.g., sand, dirt, dust, etc.) from entering the inlet 42 during the second mode of operation where the aircraft is more likely to be near the ground; e.g., for landing or takeoff.

To enter this second mode of operation while the second ring gear 102 of FIG. 2 is rotating about the axis 28, 40, 98, the ring gear brake 108 may be engaged to brake rotation of the second ring gear 102. Once the second ring gear 102 is braked to a zero rotational velocity about the axis 28, 40, 98, the lock device 106 may be engaged as described above to fix rotation of the second ring gear 102. The ring gear brake 108 may subsequently be released. By contrast, to leave the second mode of operation to permit rotation of the second ring gear 102 about the axis 28, 40, 98, the lock device 106 may be disengaged and the splined outer element 116 may be moved to the third mode position of FIG. 5C.

During the third mode of operation, the splined outer element 116 of FIG. 5C is disengaged from the first splined inner element 112 and the second splined inner element 114. The lock device 106 of FIG. 2 may thereby be disengaged (e.g., unlocked) and the first propulsor rotor 22 and the second propulsor rotor 24 may rotate unencumbered by the lock device 106.

Figure 8:
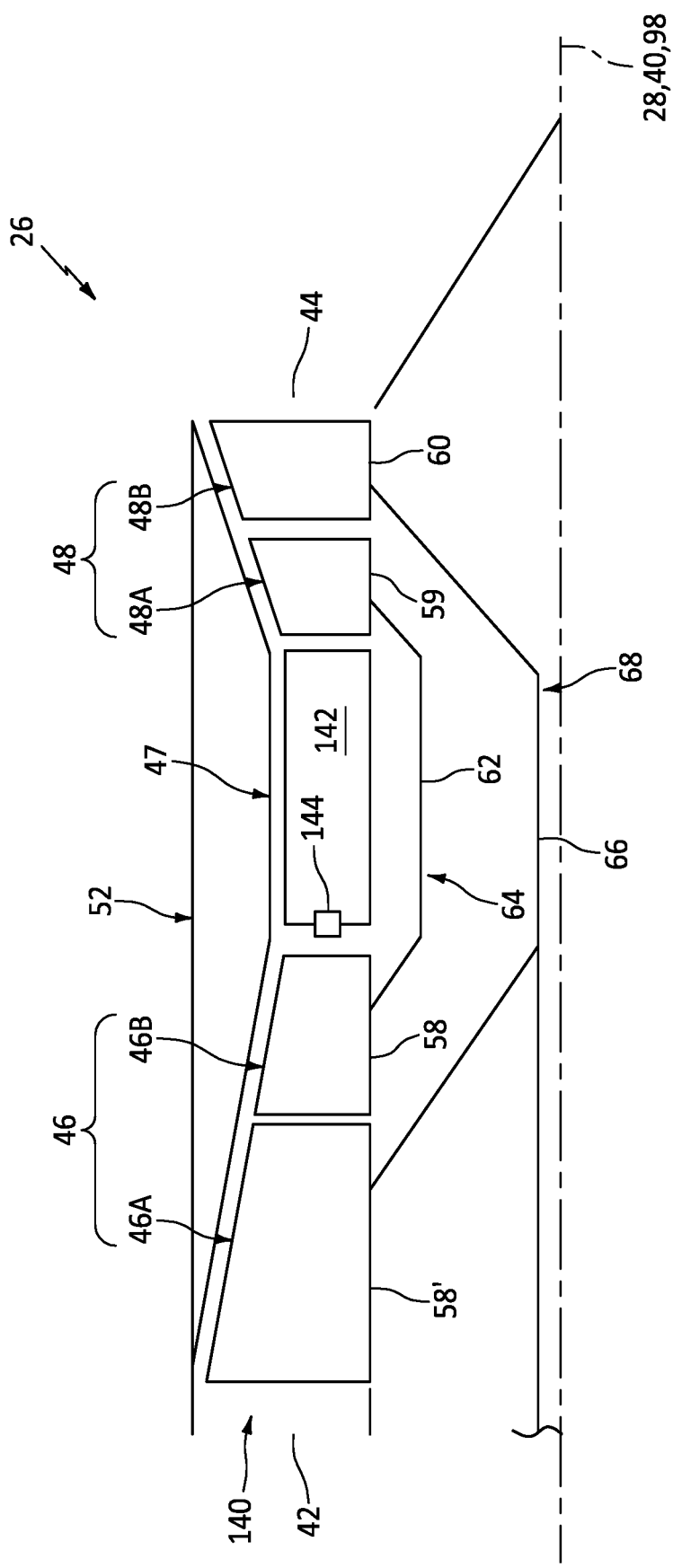
FIG. 8 is a partial schematic illustration of a gas turbine engine core with multi-staged compressor rotors.

In some embodiments, referring to FIG. 1, the low speed rotating structure 68 may be configured without a compressor rotor. In other embodiments, referring to FIG. 8, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 9:
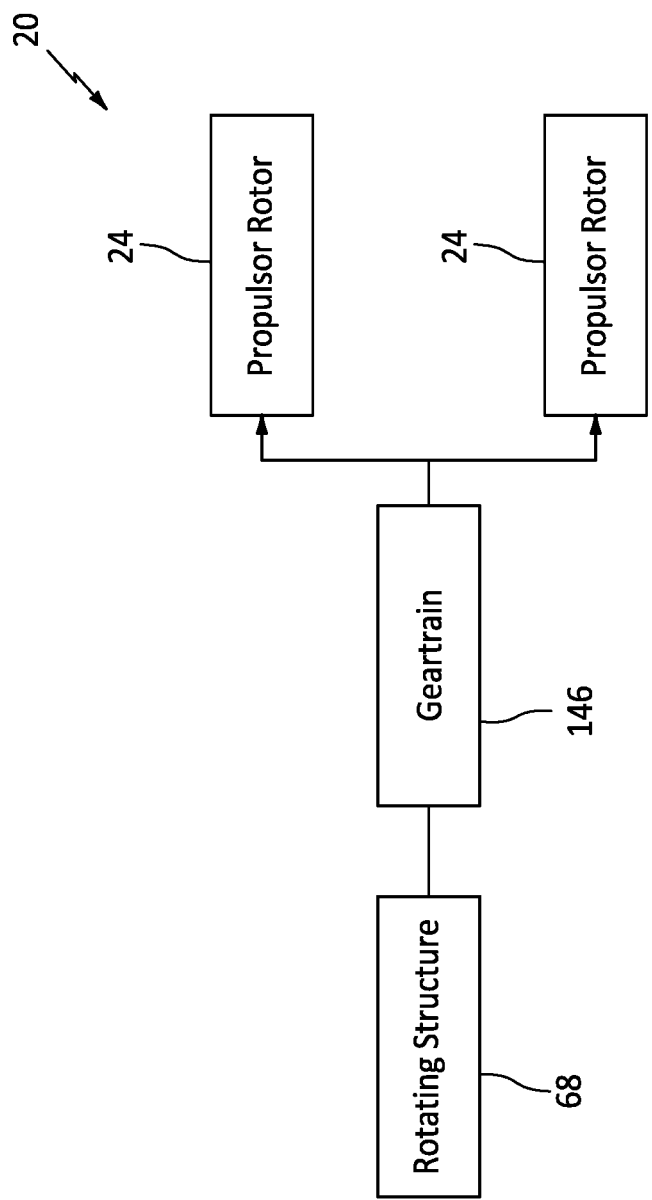
FIG. 9 is a partial schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 9 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 146.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a carrier;
   a first gear system including a sun gear, a first ring gear and a plurality of first intermediate gears between and meshed with the sun gear and the first ring gear, and each of the plurality of first intermediate gears rotatably mounted to the carrier;
   a second gear system including a second ring gear and a plurality of second intermediate gears meshed with the second ring gear, and each of the plurality of second intermediate gears rotatably mounted to the carrier;
   a lock device configured to lock rotation of the carrier about an axis during a first mode, and the lock device configured to unlock rotation of the carrier about the axis during a second mode; and
   a gas turbine engine core including a compressor section, a combustor section, a turbine section and a rotating structure;
   the rotating structure comprising a turbine rotor within the turbine section; and
   the rotating structure coupled to and configured to drive rotation of the sun gear.

2. The assembly of claim 1, wherein each of the plurality of second intermediate gears is rotatable with a respective one of the plurality of first intermediate gears.

3. The assembly of claim 1, wherein the lock device is further configured to
   unlock rotation of the second ring gear about the axis during the first mode; and
   lock rotation of the second ring gear about the axis during the second mode.

4. The assembly of claim 3, wherein the lock device is further configured to unlock rotation of the carrier about the axis and unlock rotation of the second ring gear during a third mode.

5. The assembly of claim 4, wherein the lock device includes
   a first splined inner element configured with the carrier;
   a second splined inner element configured with the second ring gear; and
   a splined outer element configured to translate along the axis, the splined outer element meshed with the first splined inner element during the first mode, the splined outer element meshed with the second splined inner element during the second mode, and the splined outer element disengaged from the first splined inner element and the second splined inner element during the third mode.

6. The assembly of claim 5, wherein
   the splined outer element is in a first mode position during the first mode;
   the splined outer element is in a second mode position during the second mode; and
   the splined outer element is in a third mode position during the third mode, and the third mode position is axially between the first mode position and the second mode position along the axis.

7. The assembly of claim 1, further comprising a brake configured to brake rotation of the carrier about the axis.

8. The assembly of claim 7, wherein
   the brake is configured to brake rotation of the carrier about the axis to a zero rotational speed about the axis; and
   the lock device is configured to lock rotation of the carrier about the axis when the carrier is at the zero rotational speed.

9. The assembly of claim 7, wherein the brake comprises a disk brake.

10. The assembly of claim 1, further comprising a brake configured to brake rotation of the second ring gear about the axis.

11. The assembly of claim 10, wherein
    the brake is configured to brake rotation of the second ring gear about the axis to a zero rotational speed about the axis; and
    the lock device is configured to lock rotation of the second ring gear about the axis when the second ring gear is at the zero rotational speed.

12. The assembly of claim 10, wherein the brake comprises a disk brake.

13. An assembly for an aircraft propulsion system, comprising:
    a carrier;
    a first gear system including a sun gear, a first ring gear and a plurality of first intermediate gears between and meshed with the sun gear and the first ring gear, and each of the plurality of first intermediate gears rotatably mounted to the carrier;
    a second gear system including a second ring gear and a plurality of second intermediate gears meshed with the second ring gear, and each of the plurality of second intermediate gears rotatably mounted to the carrier;
    a lock device configured to lock rotation of the carrier about an axis during a first mode, and the lock device configured to unlock rotation of the carrier about the axis during a second mode; and
    a first propulsor rotor coupled to and configured to be rotatably driven by the first ring gear.

14. The assembly of claim 13, further comprising a second propulsor rotor coupled to and configured to be rotatably driven by the carrier.

15. The assembly of claim 14, wherein
    the first propulsor rotor is rotatable about the axis; and
    the second propulsor rotor is rotatable about a second axis that is angularly offset from the axis.

16. The assembly of claim 14, wherein
    the first propulsor rotor is configured to generate propulsive force in a first direction; and
    the second propulsor rotor is configured to generate propulsive force in a second direction that is different than the first direction.

17. An assembly for an aircraft propulsion system, comprising:
    a carrier;
    a first gear system including a sun gear, a first ring gear and a plurality of first intermediate gears between and meshed with the sun gear and the first ring gear, and each of the plurality of first intermediate gears rotatably mounted to the carrier;
    a second gear system including a second ring gear and a plurality of second intermediate gears meshed with the second ring gear, and each of the plurality of second intermediate gears rotatably mounted to the carrier; and
    a lock device configured to unlock rotation of the second ring gear about an axis during a first mode, and the lock device configured to lock rotation of the second ring gear about the axis during a second mode;
    wherein each of the plurality of second intermediate gears is rotationally fixed to a respective one of the plurality of first intermediate gears.

18. The assembly of claim 17, wherein the sun gear is configured to drive rotation of the first ring gear about the axis during the first mode and the second mode.

\* \* \* \* \*